US012709043B2

(12) United States Patent
Dürr et al.

(10) Patent No.: US 12,709,043 B2
(45) Date of Patent: Aug. 18, 2026

(54) DEVICE AND METHOD FOR PROCESSING BULK MATERIAL

(71) Applicant: Coperion GmbH, Stuttgart (DE)

(72) Inventors: Michael Dürr, Wolfegg (DE); Klaus Menna, Tomball, TX (US); Bob Reischl, Houston, TX (US); Holger Risch, Berg (DE)

(73) Assignee: COPERION GMBH, Stuttgart (DE)

( * ) Notice: Subject to any disclaimer, the term of this patent is extended or adjusted under 35 U.S.C. 154(b) by 520 days.

(21) Appl. No.: 18/194,842

(22) Filed: Apr. 3, 2023

(65) Prior Publication Data

US 2023/0234264 A1 Jul. 27, 2023

Related U.S. Application Data

(63) Continuation of application No. PCT/EP2021/075318, filed on Sep. 15, 2021.

(30) Foreign Application Priority Data

Oct. 5, 2020 (DE) ..................... 10 2020 212 546.5

(51) Int. Cl.
*B29C 48/285* (2019.01)
*B29C 31/02* (2006.01)
*B29C 31/06* (2006.01)

(52) U.S. Cl.
CPC ............ *B29C 31/061* (2013.01); *B29C 31/02* (2013.01)

(58) Field of Classification Search
CPC .. B29B 7/603; B29B 7/88; B29B 7/42; B29B 7/728; B29C 2948/926

(Continued)

(56) References Cited

U.S. PATENT DOCUMENTS 2,999,762 A * 9/1961 Verdier ................. B29B 7/7495 106/500
3,165,299 A * 1/1965 Balamuth ............. B01F 31/841 366/127

(Continued)

FOREIGN PATENT DOCUMENTS

DE 2117588 A1 10/1972
DE 2838110 A1 3/1980

(Continued)

OTHER PUBLICATIONS

European Office Action for Application No. 21 777 734.1 with English translation dated Feb. 14, 2024.

(Continued)

*Primary Examiner* — Charles P. Cheyney
(74) *Attorney, Agent, or Firm* — DINSMORE & SHOHL LLP

(57) ABSTRACT

A processing system for bulk material comprises a processing device for the bulk material, at least one bulk material storage container for storing the bulk material, a bulk material dosing device connected to the at least one bulk material storage container for dosed discharge of the bulk material from the bulk material storage container, a bulk material downcomer connected to the bulk material dosing device for conveying the bulk material into the processing device, at least one additive feed for feeding an additive, an additive dosing device connected to the at least one additive feed for dosed discharge of the additive from the additive feed, and an additive downcomer connected to the additive dosing device for conveying the additive into the processing device, wherein the bulk material downcomer directly connects the bulk material dosing device to the processing device.

29 Claims, 9 Drawing Sheets

(58) Field of Classification Search
USPC .......................................... 425/145; 264/40.7
See application file for complete search history.

(56) References Cited

U.S. PATENT DOCUMENTS

| | | | | |
|---|---|---|---|---|
| 4,448,736 | A * | 5/1984 | Emery | B29B 9/06 425/149 |
| 4,498,783 | A * | 2/1985 | Rudolph | G05D 11/134 366/132 |
| 4,684,488 | A * | 8/1987 | Rudolph | B29B 7/603 425/169 |
| 5,158,725 | A * | 10/1992 | Handa | B29B 7/603 366/85 |
| 5,776,281 | A * | 7/1998 | Evans | B29B 7/88 156/244.11 |
| 5,811,038 | A * | 9/1998 | Mitchell | B29C 48/39 264/209.6 |
| 10,899,041 | B2 * | 1/2021 | Kruempel | B29C 48/298 |
| 11,648,720 | B2 * | 5/2023 | Schramm | B29C 48/2692 264/40.1 |
| 2004/0206246 | A1 * | 10/2004 | Bortone | B29C 48/92 99/450.2 |
| 2014/0023743 | A1 | 1/2014 | Donohoo et al. | |
| 2017/0259458 | A1 * | 9/2017 | Kruempel | B29C 48/022 |
| 2023/0312917 | A1 * | 10/2023 | Licata | C08J 3/226 525/450 |

FOREIGN PATENT DOCUMENTS

| | | | |
|---|---|---|---|
| DE | 3506635 | A1 | 9/1987 |
| DE | 40 38 901 | A1 | 11/1991 |
| DE | 29512047 | U1 | 9/1995 |
| DE | 10108706 | A1 | 8/2004 |
| DE | 102007050739 | A1 | 3/2010 |
| DE | 102011078948 | A1 | 9/2014 |
| DE | 102013100812 | B4 | 3/2020 |
| EP | 0937969 | A1 | 7/2004 |
| EP | 3186051 | B1 | 4/2018 |
| EP | 3186052 | B1 | 2/2022 |
| JP | 2020111067 | A | 7/2020 |
| WO | 2016055043 | A1 | 4/2016 |

OTHER PUBLICATIONS

German Examination Report for Application No. 10 2020 212 546.5, dated Apr. 29, 2021, 6 pages.

International Search Report for Application No. PCT/EP2021/075318 mailed Dec. 22, 2021, 13 pages. Translation of Search Report included.

* cited by examiner

DEVICE AND METHOD FOR PROCESSING BULK MATERIAL

CROSS-REFERENCES TO RELAYED APPLICATIONS

This application claims the priority of German Patent Application, Serial No. DE 10 2020 212 546.5, filed Oct. 5, 2020, the content of which is incorporated herein by reference in its entirety as if fully set forth herein.

FIELD OF THE INVENTION

The invention relates to a processing system for bulk material and a method for processing bulk material.

BACKGROUND OF THE INVENTION

WO 2016/055 043 A1 discloses a method for producing plastic products by means of an extruder. Two dosing units are connected to an extruder in order to optionally feed different plastic granulate mixtures to the extruder. For this purpose, each dosing unit has a dosing station for a main component and a plurality of dosing stations for secondary components. All dosing stations lead into a combining point, which is closed by means of a gate valve. The main component and the secondary component are collected and mixed together at the combining point. The plastic granulate mixture produced in this manner is fed to the extruder.

SUMMARY OF THE INVENTION

It is an object of the present invention to simplify the processing of bulk material and, in particular, to reduce the system expenditure, especially the investment costs for a processing system.

This object is achieved according to the invention by a processing system for bulk material comprising a processing device for the bulk material, at least one bulk material storage container for storing the bulk material, a bulk material dosing device connected to the at least one bulk material storage container for dosed discharge of the bulk material from the bulk material storage container, a bulk material downcomer connected to the bulk material dosing device for conveying the bulk material into the processing device, at least one additive feed for feeding an additive, an additive dosing device connected to the at least one additive feed for dosed discharge of the additive from the additive feed, an additive downcomer connected to the additive dosing device for conveying the additive into the processing device, wherein the bulk material downcomer directly connects the bulk material dosing device to the processing device and by a method for processing bulk material, comprising the steps of dosed discharge of the bulk material from at least one bulk material storage container by means of a bulk material dosing device connected thereto, direct conveying of the bulk material from the bulk material dosing device through a bulk material downcomer into a processing device, dosed discharge of an additive from at least one additive feed by means of an additive dosing device connected thereto, conveying the additive from the additive dosing device through an additive downcomer into the processing device.

According to the invention, it has been recognized that the effort required for pre-mixing bulk material prior to adding it to a processing device, in particular to an extruder, can be reduced, since in the processing device, in particular in the extruder itself cross-mixing takes place which is sufficient for processing the bulk material.

The bulk material, which in particular comprises powder, granules and/or flakes, is stored in at least one bulk material storage container. Powder has an average particle size of 70 μm to 2500 μm, in particular of 100 μm to 2200 μm, in particular of 120 μm to 2000 μm. Granules in particular have an average particle size of 2000 μm to 7000 μm, in particular of 2500 μm to 6000 μm and in particular of 2500 μm to 5000 μm. Flakes have an average particle size of in particular 1000 to 10000 μm, in particular of 1000 to 8000 μm and in particular of 1500 to 6000 μm.

The bulk material storage container is in particular a bulk material silo, which is also referred to as a day silo. The processing system may in particular comprise several bulk material storage containers, each of which is connected to the processing device via a separate bulk material downcomer. It is also possible for several bulk material downcomers to open into a common bulk material downcomer that directly connects the respective bulk material dosing devices to the processing device.

A bulk material collecting dosing device, in particular a rotary valve, is connected to the at least one bulk material storage container in order to discharge the bulk material from the bulk material storage container in a dosed manner.

Alternatively, the bulk material dosing device can be designed as a screw conveyor, vibratory conveyor or belt conveyor.

A bulk material downcomer is connected to the bulk material dosing device to convey the bulk material into the processing device. The bulk material downcomer has a nominal width of between 250 mm and 700 mm for large-scale systems and between 100 mm and 400 mm for compounding systems. In particular, at least sections of the bulk material downcomer are inclined relative to the horizontal. The bulk material downcomer enables gravimetric conveying of the bulk material.

The bulk material downcomer directly connects the bulk material dosing device with the processing device. The bulk material is conveyed, in particular at least proportionally, from the bulk material dosing device by means of the bulk material downcomer directly, in particular unmixed, into the processing device. The proportion of the bulk material flow which is conveyed directly from the bulk material dosing device by means of the bulk material downcomer into the processing device is at least 70% of the production rate of the processing device, in particular at least 75%, in particular at least 80%, in particular at least 85%, in particular at least 90% and in particular at least 95%. This means that a mixing/transport device, which serves to transport and/or mix bulk material, can be avoided between the bulk material dosing device and the processing device. It has been found that such a mixing/transport device is dispensable.

The processing system serves in particular for the production or processing of plastics and/or in the recycling industry. Plastics are in particular polyolefins, in particular polypropylene (PP) and/or polyethylene (PE). The processing system can also serve for polyolefins with low melting points, in particular ethylene-vinyl acetate copolymers (EVA), or polyolefin plastics for cable production such as cross-linked polyethylene (XLPE). It is also conceivable to process polyvinyl chloride (PVC), in particular PVC from emulsion polymerization (E-PVC), from suspension polymerization (S-PVC) and/or from mass polymerization (M-PVC). It is also possible to process PVC dry blend. Furthermore, engineering plastics such as polyamide (PA), polycarbonate (PC), polyethylene terephthalate (PET) and/or recycled regrind can be processed.

The processing system has at least one additive feed and in particular a plurality of additive feeds to feed one or more additives to the bulk material. In particular, between two and six and in particular up to ten additive feeds are provided. The additive supply takes place in particular in the form of a, in particular mobile, delivery station, in particular a big bag emptying station and/or a vacuum charging station. These delivery stations are in particular mobile storage containers, which are also referred to as Flexible Intermediate Bulk Containers (FIBC). An intermediate storage container, also known as an intermediate bulk container (IBC), can also be used as an additive feed. Additive supply is also possible in the form of bagged goods, drums and/or premix containers.

Additives are, in particular, aggregates such as color pigments, stabilizers, anti-blocking agents, process aids, stearates, titanium dioxide, plasticizers and/or whiteners to influence the properties of a bulk mixture.

The additives can be classified according to their flow properties. For example, there are powdery additives with an average particle size of less than 100 μm. Such additives are cohesive, i.e. they tend to stick together. Powdered additives with an average particle size between 100 μm and 300 μm are essentially free-flowing. A granular or beaded additive with an average particle size of 300 μm to 2000 μm is free-flowing. Additives that are pelletized and/or press granulated have an average particle size of 2000 μm to 6000 μm and are free-flowing.

The additives can also be classified according to their melting point. The melting point can be low, i.e. below the temperature of the bulk material, in particular the plastic particles, in particular the plastic granulate and/or the plastic powder. The temperature of the bulk material is in particular between 60° C. and 100° C. and in particular between 60° C. and 80° C. The melting point of the additive can also be in the range of the temperature of the bulk material, in particular of the plastic granules and/or of the plastic powder, i.e. in particular between 60° C. and 100° C., in particular between 60° C. and 80° C. It is advantageous if the melting point of the additive is greater than 100°. The risk of sticking and/or caking with such additives is reduced. Additives whose melting point is higher than that of the bulk material, in particular the plastic granulate and/or the plastic powder, are advantageous for processing. The melting point is typically at a temperature greater than 100° C., in particular greater than 110° C. and in particular greater than 120° C. The processing of these additives is usually uncritical.

Additives can also be classified according to their formulation. Additives can be used pure, i.e. unmixed with other ingredients, such as in particular antioxidants, lubricants, antistatics, anti-blocking agents and/or process aids. It is also possible to create a premix from several additives and use it in the processing system. Such a premix is typically specially adapted to the processing system and the material to be produced with it.

An additive dosing device is connected to the additive feed in order to discharge the additive from the additive feed in a dosed manner. The additive dosing device is in particular a loss-in-weight feeder, a Coriolis scale and/or a baffle plate quantity measurement with a rotary valve. An additive downcomer is connected to the additive dosing device to convey the additive into the processing device. The additive downcomer has a nominal width of between 80 mm and 350 mm. The additive dosing device is in particular indirectly connected to the processing device. In particular, the additive dosing device is not directly connected to the processing device.

A processing system configured such that the bulk material downcomer is oriented at least in sections, in particular completely, with respect to the vertical at an angle of inclination, wherein the angle of inclination is in particular between 10° and 75°, in particular between 20° and 60°, in particular between 20° and 45° and in particular between 20° and 35°, is designed to be particularly uncomplicated. Due to the fact that the bulk material downcomer is oriented at an angle of inclination relative to the vertical at least in sections, in particular over at least 50% of its length, in particular over at least 60% of its length, in particular over at least 70% of its length, in particular over at least 80% of its length, in particular over at least 90% of its length and in particular over at least 95% of its length, gravimetric conveyance of the bulk material along the bulk material downcomer is reliably ensured. The angle of inclination with respect to the vertical is in particular different from 0°. The angle of inclination with respect to the vertical is in particular between 10° and 75°, in particular between 20° and 60°, in particular between 20° and 45° and in particular between 20° and 35°. In particular, a plugging of the bulk material downcomer and/or an insufficient dosing of bulk material into the processing device is avoided. In particular, the angle of inclination is determined in dependence on the wall friction angle of the bulk material with the surface of the inside of the bulk material downcomer. In particular, the wall friction angle is influenced by the surface design, especially the roughness, of the inner surface of the bulk material downcomer.

Alternatively, it is possible for the bulk material downcomer to be oriented exactly vertically.

A processing system configured such that the processing device is designed as an extruder, wherein the bulk material downcomer opens in particular directly into the extruder, in particular into an extruder preliminary container of the extruder, enables advantageous processing of the bulk material. In particular, the bulk material is cross-mixed with the at least one additive in the extruder. An extruder preliminary container may be arranged at the extruder. The extruder preliminary container facilitates the supply of the bulk material and/or the at least one additive. In particular, the extruder preliminary container enables a temporary intermediate storage of the bulk material and/or the additive during the feeding into the extruder. Furthermore, the extruder preliminary container enables a separation of displacement air from the extruder and/or a separation of purge air from the additive feed, the additive dosing device and/or the additive downcomer.

A processing system configured such that the additive downcomer opens into the bulk material downcomer, in particular into a junction nozzle of the bulk material downcomer, wherein the additive downcomer and the bulk material downcomer are arranged in particular at an acute angle to one another enables a particularly uncomplicated design. Due to the fact that the additive downcomer opens, in particular directly, into the bulk material downcomer means that the at least one additive is fed into the flowing bulk material. The risk of caking of the additive on an inner surface of the downcomer is reduced. It has been recognized that it is advantageous if the additive downcomer and the bulk material downcomer enclose an acute angle. An acute angle is less than or equal to 90°, in particular less than or equal to 80°, in particular less than or equal to 70°, in particular less than or equal to 60°, in particular less than or equal to 50°, in particular less than or equal to 45°, in particular less than or equal to 40°, in particular less than or equal to 30°, in particular less than or equal to 25° and in particular less than or equal to 20°.

A processing system configured such that the additive downcomer is arranged in the bulk material downcomer, in particular in the junction nozzle, at a penetration depth, wherein the penetration depth is at least 60% of an inner diameter of the bulk material downcomer, in particular at least 80% of the inner diameter of the bulk material downcomer and at least 90% of the inner diameter of the bulk material downcomer, improves the direct addition of the additive into the bulk material downcomer. The risk that additive can be deposited in the region where the additive downcomer enters the bulk material down-corner and/or in the bulk material downcomer itself, in particular due to turbulence in the free space above the bulk material flow, is reduced. In particular, the risk of the at least one additive adhering and/or caking and/or sticking to the inner surface of the bulk material downcomer is reduced. In particular, it has been recognized that the flow of the bulk material in the bulk material downcomer, which is in particular inclined with respect to the vertical, flows in a lower region of the bulk material downcomer as a result of gravity. The penetration depth ensures that the added additive is carried along by the bulk material flow and is distributed in the bulk material flow. The penetration depth is understood to be the lowest point of the additive downcomer that protrudes into the bulk material downcomer.

It is advantageous if the additive downcomer is inclined at its opening arranged in the bulk material downcomer with respect to the longitudinal axis of the additive downcomer. The bevel angle is understood to be the inclination of a plane defined by a discharge opening of a junction nozzle with respect to the of the bulk material downcomer longitudinal axis. The bevel angle and the angle of inclination of the bulk material downcomer complement each other to form an angle which is in particular less than or equal to 90°. If the bevel angle is 0°, the additive downcomer is arranged with its outlet in the bulk material downcomer parallel to its longitudinal axis. It is advantageous if the bevel angle is in a range between 0° and 60°, in particular between 0.5° and 45°, in particular between 1° and 30°, in particular between 1° and 20°, in particular between 1° and 15°, in particular between 1° and 10° and in particular between 1° and 5°. It is advantageous if the sum of the bevel angle and the angle of inclination of the bulk material downcomer results in a sum angle which is smaller than or equal to 80°, in particular smaller than or equal to 70°, in particular smaller than or equal to 60°, in particular smaller than or equal to 55°, in particular smaller than or equal to 50° and in particular smaller than or equal to 48°.

Additionally or alternatively, the additive downcomer can have a straight or rounded shape in the region of its outlet. In the case of a rounded shape, a rounding radius can be provided, which in particular is between half the nominal width of the additive downcomer and half the nominal width of the bulk material downcomer. Alternatively, the outlet of the additive downcomer can also be elliptical or designed with an obtuse angle.

Alternatively, it is possible that the additive downcomer is attached to the bulk material downcomer, in particular welded on, without the additive downcomer dipping into the bulk material downcomer. In this case, the additive downcomer opens directly into an opening provided for this purpose in the bulk material downcomer. In this case, the immersion depth is 0.

A processing system configured such that a flow guiding member is arranged in the bulk material downcomer upstream of the junction of the additive downcomer with the bulk material downcomer additionally avoids the risk of an accumulation of the bulk material and/or a mixture of bulk material and the additive along the bulk material downcomer. A flow guiding member is in particular fastened in the bulk material downcomer. A flow guiding member can be, for example, a flow straightener, in particular a flow guiding plate.

A processing system configured such that the additive downcomer is oriented at least in sections, in particular completely, with respect to the vertical at an angle of inclination, wherein the angle of inclination is in particular less than or equal to 40°, in particular less than or equal to 30° and in particular less than or equal to 15°, enables reliable, gravimetric conveyance of the additive. The additive downcomer is oriented at least in sections and in particular over 60% of its length, in particular over 70% of its length, in particular over 80% of its length, in particular over 90% of its length and in particular over 95% of its length with a non-zero angle of inclination. The angle of inclination with respect to the vertical is in particular less than or equal to 40°, in particular less than or equal to 30° and in particular less than or equal to 15°. An additive downcomer inclined with respect to the vertical is particularly advantageous when using an additive which fluidizes strongly when flowing. Due to the fact that the additive flows in the inclined additive downcomer, it does not become too fluid. An additive fed in this manner is better carried along by the bulk material flow in the bulk material downcomer and/or better mixed with the bulk material flow in the bulk material downcomer. The risk of caking is reduced.

Alternatively, it is possible for the additive downcomer to be oriented exactly vertically.

A processing system comprising a cooling unit for cooling the bulk material downcomer and/or the additive downcomer, wherein the cooling unit is attached in particular directly to the bulk material downcomer and/or to the additive downcomer, reduces the risk of caking. A cooling unit serves to cool the bulk material downcomer and/or the additive downcomer. A cooling unit can in particular be designed in the form of at least one cooling plate, which is attached to an outer wall of the respective downcomer. Alternatively or additionally, it is conceivable to design the respective downcomer with double walls and to flush an intermediate space with a cooling medium, in particular cooling liquid, in particular cooling water. The cooling unit is designed as a heat exchanger due to the double-walled design of the downcomer. Additionally or alternatively, cooling gas, in particular inert gas and in particular nitrogen, can be used for cooling in the bulk material downcomer and/or in the additive downcomer. In particular, a gas flow is used for cooling the additive. In particular, the gas flow is directed in the flow direction of the additive, i.e. in co-current, starting from the outlet of the additive dosing device, in particular the loss-in-weight feeder. Cooling allows friction-induced heat to be dissipated from the respective downcomer. The risk of sticking due to heated bulk material and/or additive on the inner wall of the respective downcomer is reduced.

It is advantageous if the respective downcomer can be cooled by means of the cooling unit in such a manner that the temperature on the inside of the downcomer is at least 5° C., in particular at least 10° C. and in particular at least 15°

C. below the softening point of the additive. A double-walled cooling line can be operated in co-current or counter-current.

In addition or alternatively, it is possible to cool the bulk material downcomer at least in the junction region of the additive downcomer and/or to cool the outlet of the additive downcomer, which projects into the bulk material downcomer, indirectly via the bulk material downcomer. It is also possible to design a junction nozzle for the junction of the additive downcomer into the bulk material downcomer with an enlarged diameter compared to the additive downcomer, so that the cooled additive downcomer can project into the junction nozzle.

A flow support unit for supporting the flow in the bulk material downcomer and/or in the additive downcomer, wherein the flow support unit comprises in particular a gas supply connected to the bulk material downcomer and/or to the additive downcomer and/or a mechanical member, in particular a vibrator and/or a shaker, reduces the risk of caking and/or sticking in the respective downcomer. In particular, the bulk material downcomer may comprise a gas supply to generate a gas flow along the bulk material downcomer from the bulk material dosing device to the processing device and to assist the conveyance of the bulk material along the bulk material downcomer into the processing device. Additionally or alternatively, mechanical support devices such as vibrators and/or shakers may also be used.

A mixing/transport device, in particular a mixing/transport screw, wherein the mixing/transport device is connected to the downstream processing device, in particular via a connecting downcomer, enables intensified premixing of the bulk material with the at least one additive. The mixing/transport device is designed in particular as a mixing and/or transport screw. Alternatively, the mixing/transport device may also be designed as a vibratory conveyor. It is essential that the mixing/transport device converts a previously, at least proportionally, vertically oriented bulk material conveying direction into a, in particular exclusively, horizontally oriented bulk material conveying direction. The addition of at least one additive into the horizontally conveyed bulk material flow is improved. The bulk material flow in the mixing/transport device can also be arranged in with respect to the horizontal, wherein a corresponding angle of inclination is at most 45°, in particular at most 30°, in particular at most 15°, in particular at most 10°, in particular at most 8°, in particular at most 5°, in particular at most 3° and in particular at most 1°. The mixing/transport device is in particular connected to the downstream processing device via a connecting downcomer which is in particular vertically oriented. As a result of the fact that a minimum proportion of the bulk material is fed directly from the bulk material dosing device via the bulk material downcomer to the processing device, the mixing/transport device can be of smaller design. This reduces the investment and/or operating costs of the system. The susceptibility of the system in terms of maintenance and tightness are reduced. In particular, at most 50% of the production rate of the processing device, in particular between 2% and 45%, in particular between 3% and 40%, in particular between 4% and 35%, in particular between 4% and 30%, between 5% and 25%, in particular between 5% and 20% and in particular between 5% and 15% are added to the mixing/transport device. The production rate is the mass flow of the bulk material and the at least one additive into the processing device.

A second bulk material downcomer which connects the bulk material dosing device to the mixing/transport device enables a bulk material partial flow to be fed into the mixing/transport device.

A processing system configured such that the additive downcomer opens into the mixing/transport device enables an improved mixing of the bulk material partial flow with additive in the mixing/transport device.

A design of the mixing/transport device having a mixing/transport rate which is at most 30% of a production rate of the processing device, in particular at most 15% of the production rate of the processing device and at most 5% of the production rate of the processing device is particularly economical.

A method for processing bulk material, comprising the steps of dosed discharge of the bulk material from at least one bulk material storage container by means of a bulk material dosing device connected thereto, direct conveying of the bulk material from the bulk material dosing device through a bulk material downcomer into a processing device, dosed discharge of an additive from at least one additive feed by means of an additive dosing device connected thereto, conveying the additive from the additive dosing device through an additive downcomer into the processing device has substantially the advantages of the processing system itself to which reference is hereby made.

A method comprising cooling the bulk material downcomer and/or the additive downcomer by means of a cooling unit, which in particular is attached directly to the bulk material downcomer and/or to the additive downcomer, reduces the risk of sticking of the bulk material and/or the additive in the respective downcomer.

Both the features indicated above and the features indicated in the following embodiment examples of the processing system according to the invention are each suitable, either on their own or in combination with one another, to further embody the subject-matter according to the invention. The respective combinations of features do not represent any restriction with regard to the further embodiments of the subject-matter of the invention, but are essentially merely exemplary in character.

Further features, advantages and details of the invention will be apparent from the following description of embodiment examples based on the drawing.

DESCRIPTION OF THE PREFERRED EMBODIMENTS

Figure 1:
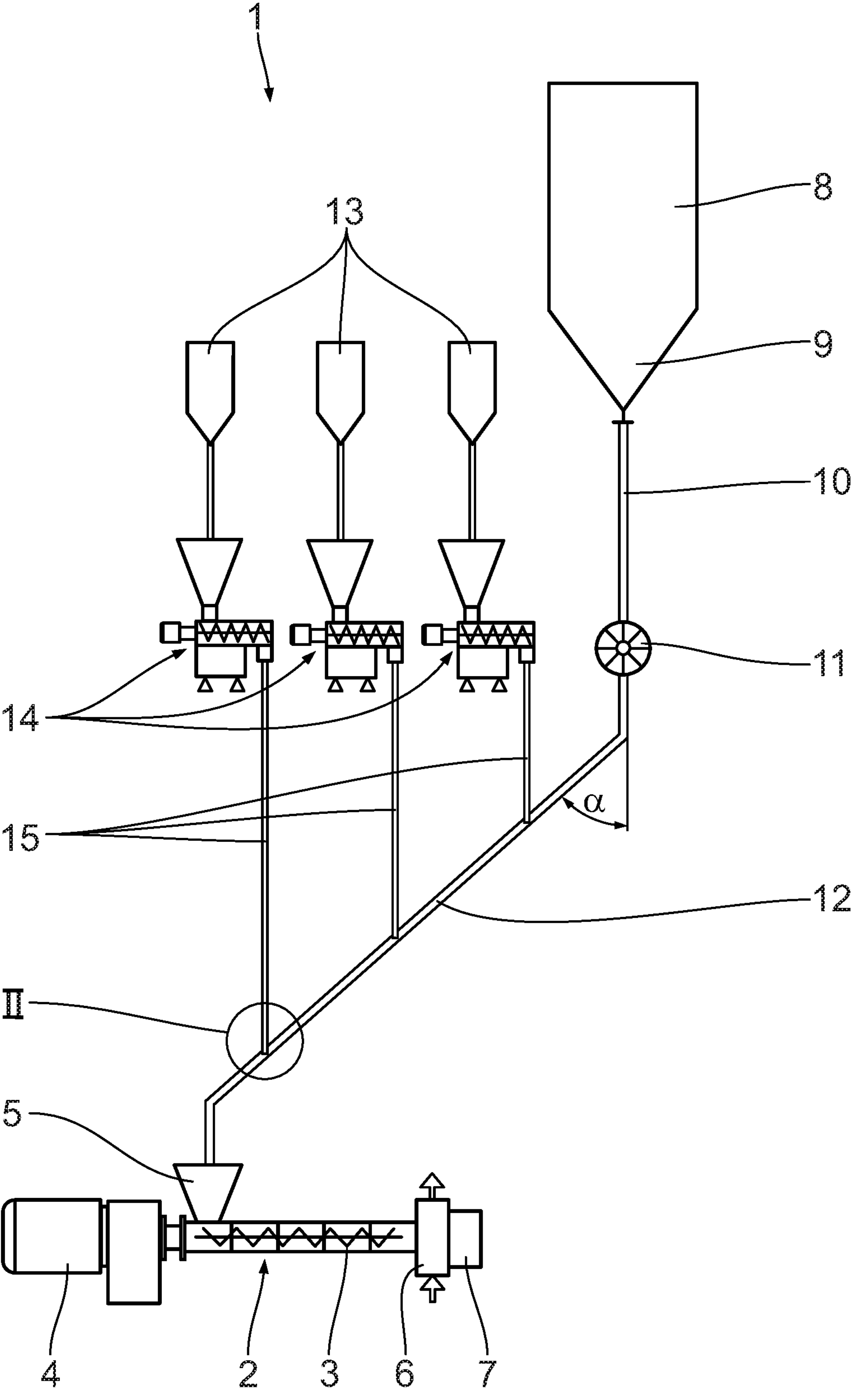
FIG. 1 shows a schematic representation of a processing system for bulk material with an inclined bulk material downcomer into which several additive downcomers open.

A processing system designated as a whole as 1 in FIG. 1 serves to process bulk material. The processing system 1 has a processing device 2 in the form of an extruder. The extruder 2 has a screw conveyor 3 and a screw drive 4 which drives the screw conveyor 3. In the inlet region of the screw conveyor 3, a funnel-shaped extruder preliminary container 5 is arranged on an upper side of the extruder 2 for feeding the bulk material into the extruder 2. The extruder 2 has a pelletizing bonnet 6 with a drive 7. The pelletizing bonnet can be designed with integrated cooling, which is indicated in FIG. 1 by the arrows for the supply and discharge of cooling medium, in particular cooling water.

The bulk material to be processed is stored in at least one bulk material storage container 8. Several bulk material storage containers 8 can be provided, in particular two bulk material storage containers 8, in particular three bulk material storage containers 8, in particular four bulk material storage containers 8, in particular six bulk material storage containers 8 and in particular more than six bulk material storage containers 8.

The bulk material storage container 8 has an outlet cone 9 to which a connection line 10 is connected. A bulk material dosing device 11 is connected to the bulk material storage container 8 via the connection line 10. According to the embodiment example shown, the connection line 10 is oriented exclusively vertically. This means that the bulk material dosing device 11 is arranged directly below the outlet opening of the outlet cone 9, i.e. directly below the bulk material storage container 8. The bulk material dosing device 11 can also be arranged laterally offset below the outlet opening of the outlet cone 9. According to the embodiment example shown, the bulk material dosing device 11 is designed as a rotary valve. The rotary valve 11 serves for the dosed discharge of the bulk material from the bulk material storage container 8.

The rotary valve 11 is directly connected to the extruder 2 by means of a bulk material downcomer 12. The bulk material downcomer 12 opens into the extruder preliminary container 5.

The bulk material downcomer 12 is oriented at least in sections at an angle of inclination $\alpha$ inclined with respect to the vertical. The bulk material delivered in a dosed manner by the rotary valve 11 is conveyed directly into the extruder 2, in particular gravimetrically, via the bulk material downcomer 12.

The processing device 1 further comprises three additive feeds 13, each of which serves to feed an additive. Depending on the product to be manufactured with the processing device, in particular the extrudate, more or less than three additive feeds 13 can also be provided. In each additive feed 13, an additive is provided either in pure form, i.e. unmixed, or as an additive mixture, a so-called premix.

The additive feeds 13 can be configured to be identical or different.

To each additive feed 13, an additive dosing device 14 is connected, which is designed as a loss-in-weight feeder according to the embodiment example shown. The additive dosing devices 14 each serve for dosed discharge of the additive. An additive downcomer 15 is connected to each of the additive dosing devices 14. In particular, up to ten additive downcomers 15 can open into the bulk material downcomer 12. The additive downcomers 15 are each vertically oriented. The additive downcomers 15 each open directly into the bulk material downcomer 12, in particular in a region of the bulk material downcomer 12 in which it is arranged in an inclined manner with respect to the vertical at the angle of inclination $\alpha$.

It is also possible that at least one of the additive downcomers 15 opens directly into the extruder preliminary container 5. This additive downcomer 15 is designed independently of the bulk material downcomer 12. This enables a separate addition of the additive into the extruder 2.

Figure 2:
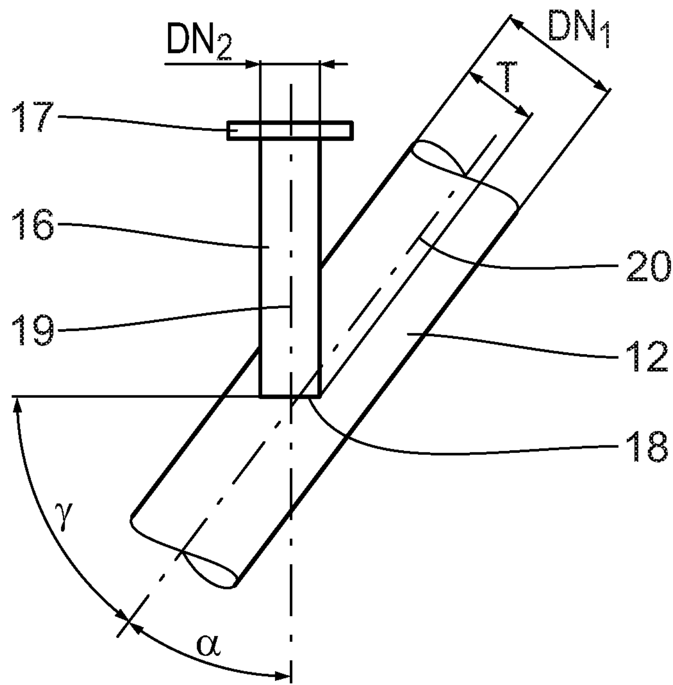
FIG. 2 shows an enlarged detail sectional representation according to detail II in FIG. 1.

In the following, the junction of the additive downcomer 15 with the bulk material downcomer 12 is explained in more detail with reference to FIG. 2. At the junction point, the bulk material downcomer 12 has a junction nozzle 16 to which the additive downcomer 15 can be connected. In particular, the additive downcomer 15 can be flanged to the junction nozzle 16 by means of a connecting flange 17. The junction nozzle 16 is designed as a cylindrical pipe. The junction nozzle 16 protrudes with a discharge opening 18 into the bulk material downcomer 12. According to the embodiment example shown, the discharge opening 18 is oriented in a plane perpendicular to the junction nozzle longitudinal axis 19. The vertically oriented junction nozzle 16 and the bulk material downcomer 12 enclose the angle of inclination $\alpha$. Accordingly, the discharge opening 18 of the junction nozzle 16 is oriented with respect to a bulk material downcomer longitudinal axis 20 with an bevel angle $\gamma$, wherein: $\gamma=90°-\alpha$.

The bulk material downcomer 12 has a nominal width $DN_1$. In the embodiment example shown, $DN_1$=350 mm.

The additive downcomer 15 has a nominal width $DN_2$. In the embodiment example shown, $DN_2$=100 mm.

The junction nozzle 16 is arranged with a penetration depth T in the bulk material down-corner 12. The penetration depth T is defined as the lowest point of the junction nozzle 16 in the bulk material downcomer 12. It is advantageous if the penetration depth T is at least 60% of the nominal width $DN_1$ of the bulk material downcomer 12. The nominal width $DN_1$ defines the inner diameter of the cylindrical bulk material downcomer 12.

A method for processing bulk material is explained in more detail below with reference to FIGS. 1 and 2.

For processing bulk material, the latter is discharged from the bulk material storage container 8 and the bulk material dosing device 11 in a dosed manner into the bulk material downcomer 12. Depending on the formulation of the product to be manufactured, at least one additive is discharged from the respective additive feed 13 and the additive dosing device 14 connected thereto into the additive downcomer 15. Since the additive down-corner 15 opens directly into the bulk material downcomer 12 via the junction nozzle 16, the additive can be fed into the bulk material flowing in the bulk material downcomer 12. The risk of caking and/or adhesion of the additive in the bulk material downcomer 12 is avoided. The flow of bulk material and at least one additive is fed from the bulk material downcomer 12 via the extruder preliminary container 5 to the extruder 2 and processed there.

Figure 3:
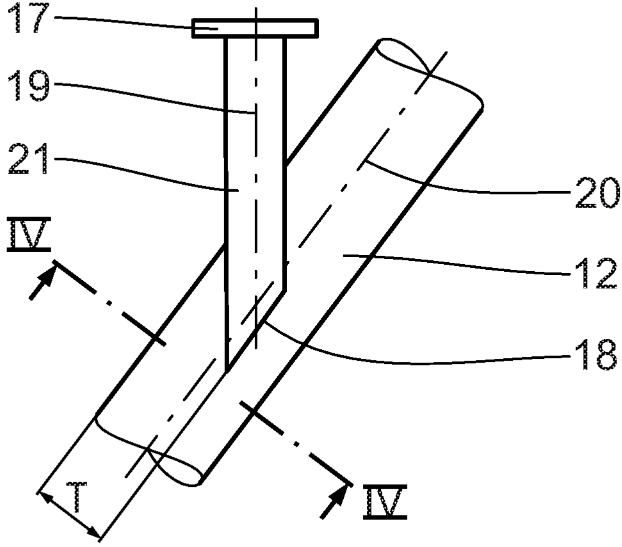
FIG. 3 shows a representation corresponding to FIG. 2 of an outlet of an additive downcomer according to a further embodiment.

In the following, a variant of a junction nozzle 21 is explained in more detail with reference to FIGS. 3 and 4. In the case of the junction nozzle 21, the discharge opening 18 is oriented with a bevel angle γ of 0° with respect to the bulk material downcomer longitudinal axis 20. The discharge opening 18 is oriented parallel to the bulk material downcomer longitudinal axis 20. Alternatively, the bevel angle γ may be greater than 0° and may be in an angular range between 1° and 10°. It has been found that the discharge of the additive into the bulk material flow in the bulk material downcomer 12 is improved by the sloped discharge opening 18.

Figure 4:
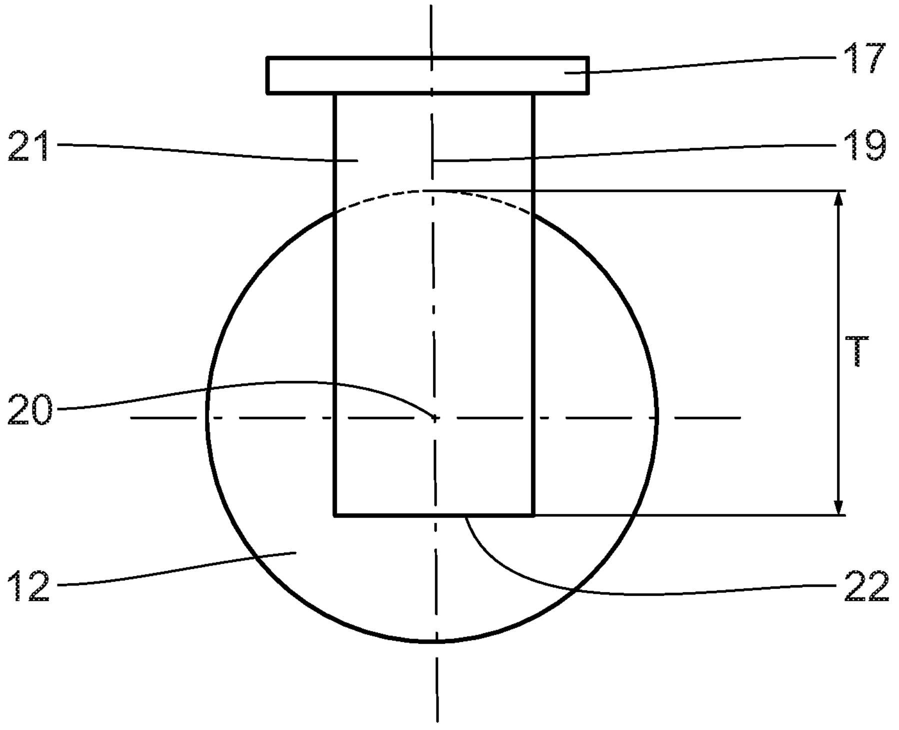
FIG. 4 shows a sectional view according to section lines IV-IV in FIG. 3.

In the direction of view of the bulk material downcomer longitudinal axis 20 according to FIG. 4, the discharge opening 18 has a straight outlet edge 22.

Figure 5:
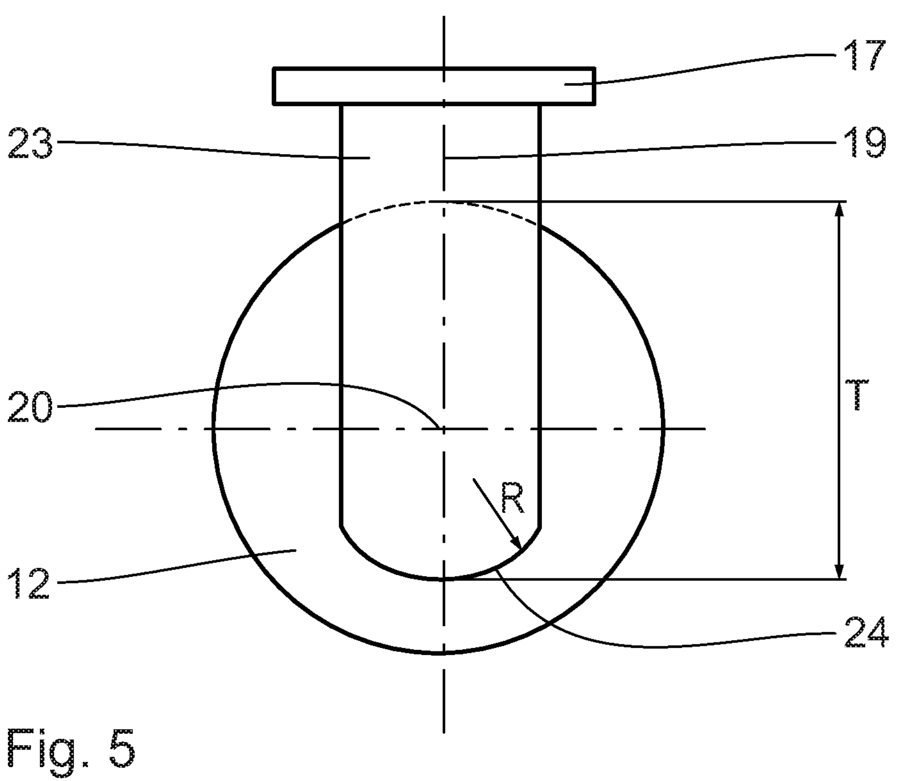
FIG. 5 shows a representation corresponding to FIG. 4 with a rounded junction outlet.

FIG. 5 shows a further variant of a junction nozzle 23 with a curved outlet edge 24. According to the embodiment example shown, the outlet edge 24 is configured to be rounded with a rounding radius R. The outlet edge 24 can also be configured to be elliptical. According to an embodiment example not shown, the outlet edge 24 can also be noncircular, in particular angular.

Figure 6:
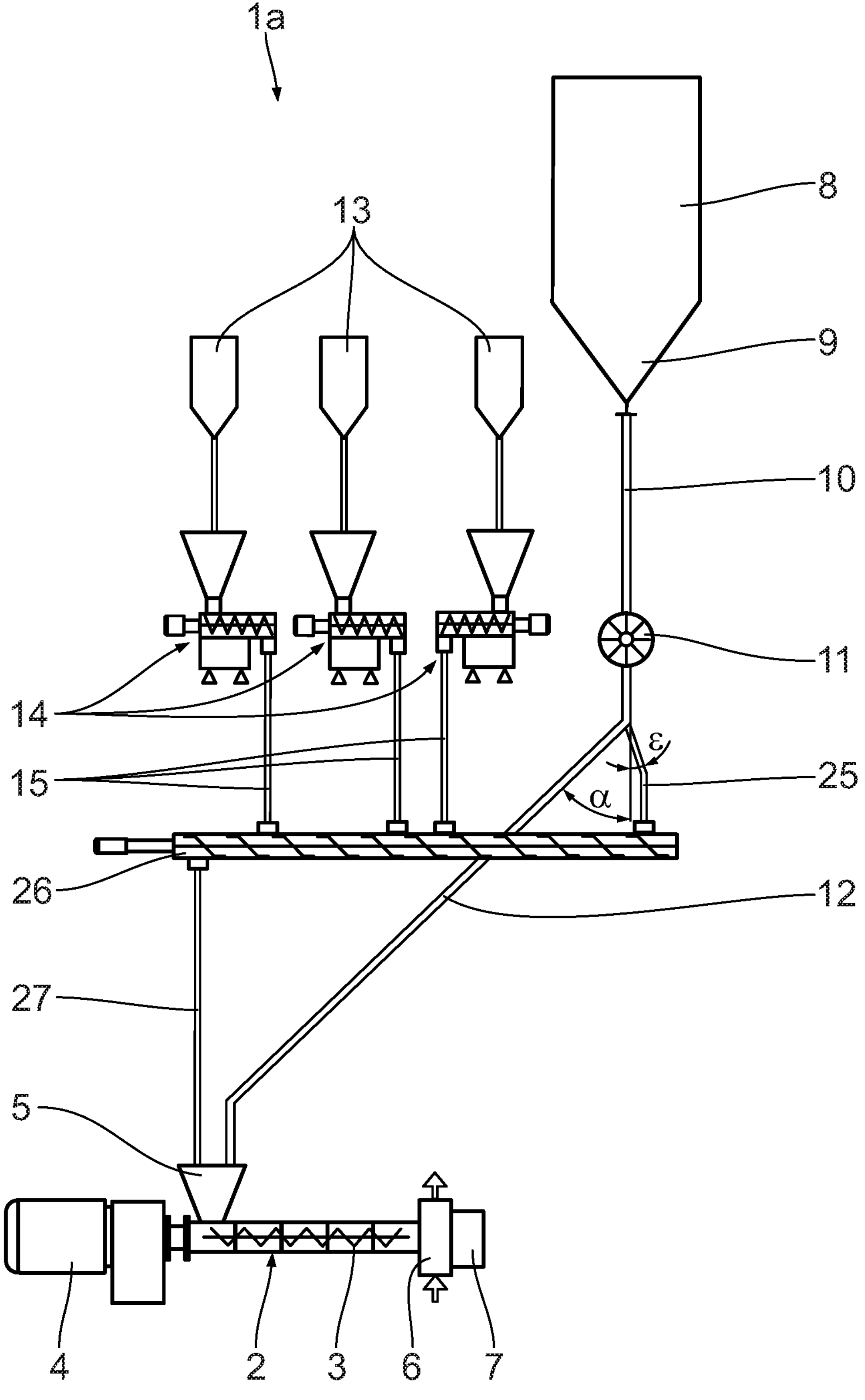
FIG. 6 shows a representation corresponding to FIG. 1 of a processing system according to a second embodiment example with a mixing/transport screw.

In the following, a second embodiment example of the invention is described with reference to FIG. 6. Constructively identical parts are given the same reference signs as in the first embodiment example, the description of which is hereby referred to. Constructively different but functionally similar parts are given the same reference signs with a trailing letter a.

The processing system 1*a* has a second bulk material downcomer 25 which is connected to the bulk material dosing device 11. The second bulk material downcomer 25 opens into a mixing/transport device 26, which is designed as a mixing/transport screw. The second bulk material downcomer 25 is arranged in an inclined manner at an angle of inclination ε with respect to the vertical. The angle of inclination ε is in particular less than or equal to 45°, in particular less than or equal to 30°, in particular less than or equal to 20° and in particular less than or equal to 10°. It is also conceivable that the second bulk material downcomer 25 is arranged vertically.

At least one additive downcomer 15 is also connected to the mixing/transport device 25. According to the embodiment example shown, all additive downcomers 15 are connected to the mixing/transport device 26.

The mixing/transport device 26 is connected to the downstream extruder 2 by means of a connecting downcomer 27.

According to the embodiment example shown, all additive downcomers 15 open into the mixing/transport device 26. It is also conceivable that at least one or more additive downcomers 15 open into the bulk material downcomer 12 according to the first embodiment example.

Due to the fact that the mixing of the bulk material with the at least one additive takes place in the extruder 2, it is sufficient that only a partial flow of the bulk material that is required for processing in the extruder 2 is fed via the second bulk material downcomer 25 of the mixing/transport device 26. As a result, the mixing/transport device 26 can be of small construction. This saves investment and operating costs. In particular, it is sufficient if the mixing/transport device 26 has a mixing/transport rate which corresponds to at most 50% of a production rate of the extruder 2. The production rate of the extruder is understood to be the mass flow of the extrudate. The mixing/transport rate of the mixing/transport device is the mass flow leaving the mixing/transport device 26.

In the following, a third embodiment example of the invention is described with reference to FIGS. 7 and 8. Constructively identical parts are given the same reference signs as in the two previous embodiment examples, the description of which is hereby referred to. Constructively different but functionally similar parts are given the same reference signs with a trailing letter b.

As in the first embodiment example, the processing system 1*b* is designed without a mixing/transport device. The additive downcomers 15 open directly into the bulk material downcomer 12.

Figure 7:
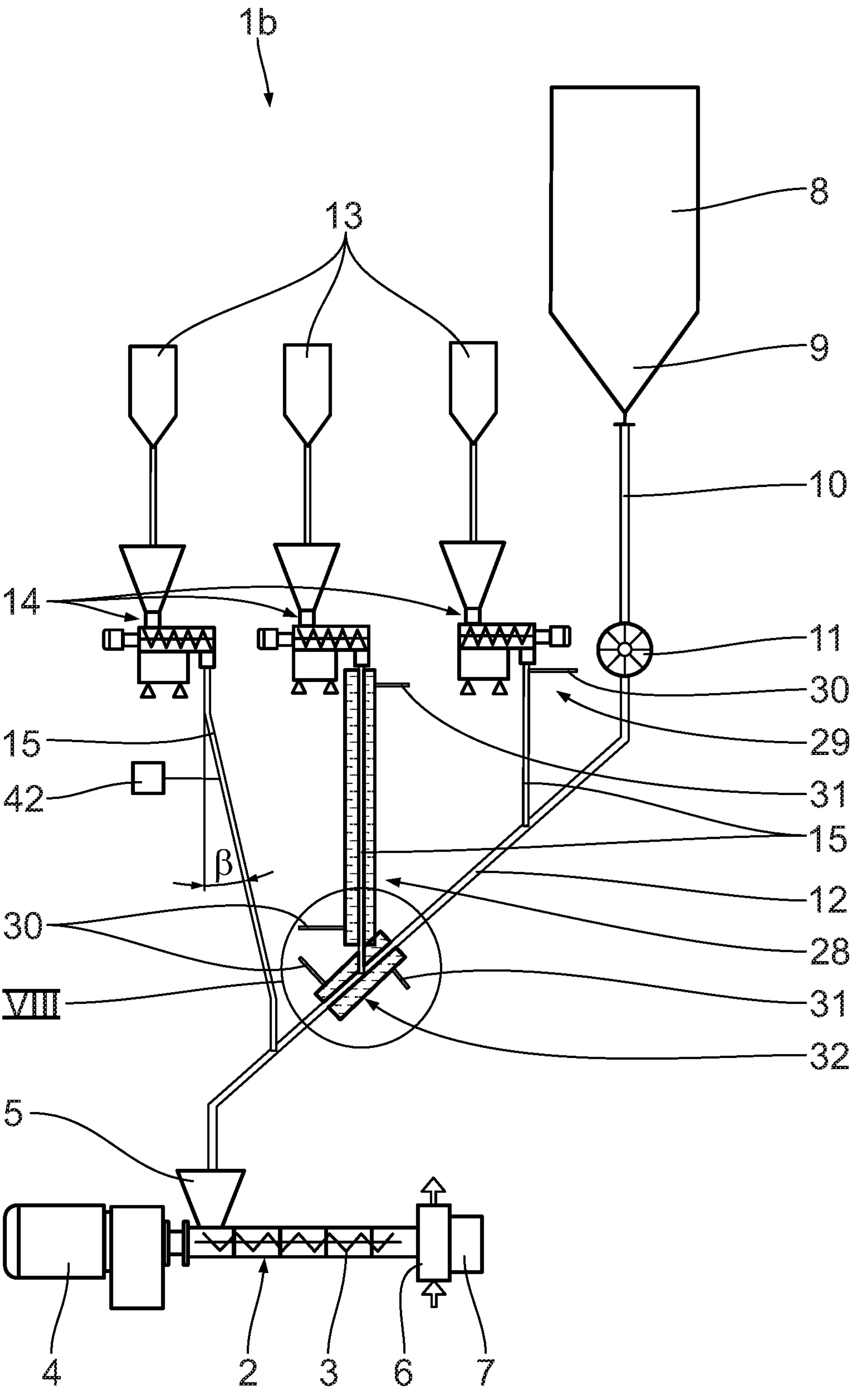
FIG. 7 shows a representation corresponding to FIG. 1 of a processing system according to a third embodiment example with a cooling unit for cooling the bulk material downcomer and an additive downcomer.

The additive downcomer 15 shown in FIG. 7 on the left is arranged at an angle of inclination β to the vertical.

The additive downcomers 15 shown in FIG. 7 in the center and those on the right are each designed with a cooling unit 28, 29 for cooling the respective additive downcomer 15.

The first cooling unit 28 is designed as a heat exchanger in the form of a double-walled pipe along the additive downcomer 15. In an annular flow channel of the double-walled pipe, a heat exchange medium, in particular a liquid, in particular water, can be used for active cooling of the additive downcomer 15. According to the embodiment example shown, a heat exchanger medium inlet 30 is provided in a lower end of the double-walled pipe that is facing the bulk material downcomer 12 and a heat exchanger medium outlet 31 is provided at an opposite end of the double-walled pipe facing the additive dosing device 14. According to the embodiment example shown, the heat exchanger medium flows against the flow direction of the additive. The heat exchanger is designed in counter-current. The heat exchanger can also be designed in co-current.

In addition, according to the embodiment example shown, the bulk material downcomer 12 has a bulk material cooling unit 32 arranged at least in the junction region of the additive downcomer 15 with the first cooling unit 28. The bulk material cooling unit 32 extends in particular only in regions along the bulk material downcomer 12. The bulk material cooling unit 32 is designed analogously to the first cooling unit 28, with a heat exchanger medium inlet 30 and a heat exchanger medium outlet 31. The bulk material cooling unit 32 is operated in counter-current.

The second cooling unit 29, which is arranged at the additive downcomer 15 shown on the right in FIG. 7, also serves to actively cool the additive. For this purpose, the second cooling unit 29 has a heat exchanger medium inlet 30, via which a cooled gas flow is fed directly into the additive downcomer 15. The heat exchanger medium inlet 30 of the second cooling unit 29 is arranged at the additive downcomer 15 in the region of the additive dosing device 14. The heat exchanger medium inlet 30 serves as a gas feed. The cooled gas flow of the second cooling unit 29 flows in the additive downcomer 15 in co-current with the additive. The cooled gas flow may additionally serve to convey the additive along the additive downcomer 15. The second cooling unit 29 represents a flow support unit.

A flow support unit in the form of a mechanical element 42 is particularly advantageous for the inclined additive downcomer 15. According to the embodiment example shown, the mechanical element 42 is designed as a shaker that is mechanically directly connected to the additive downcomer 15. The shaker can exert shaking movements on the additive downcomer. Additionally or alternatively, the mechanical element 42 can also be a vibrator.

The flow support units 29, 42 can be arranged at all downcomers 12, 15, in particular those that are arranged in an inclined manner with respect to the vertical.

Figure 8:
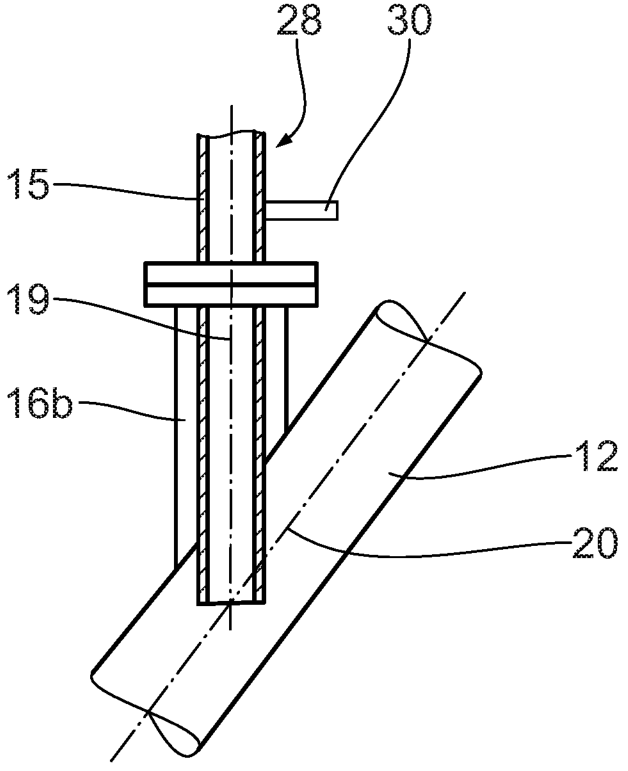
FIG. 8 shows an enlarged view of detail VIII in FIG. 7.

As shown in FIG. 8, the junction nozzle 16*b* has an enlarged inner diameter so that the double-walled additive downcomer 15 can be completely inserted into the junction nozzle 16*b* and project into the bulk material downcomer 12. For reasons of illustration, the bulk material cooling unit 32 is not shown in FIG. 8.

In the following, a fourth embodiment example of the invention is described with reference to FIGS. 9 and 10. Constructively identical parts are given the same reference signs as in the previous embodiment examples, the description of which is hereby referred to. Constructively different but functionally similar parts are given the same reference signs with a trailing letter c.

In the processing system 1*c*, two bulk material storage containers 8 are provided, each of which is connected to a bulk material collecting downcomer 33 by means of a bulk material dosing device 11, which is not shown in more detail, and a bulk material downcomer 12. The bulk material dosing device 11 is connected to a feed hopper 39 via the bulk material downcomer 12 and the bulk material collecting downcomer 33. The feed hopper 39, which is also referred to as an extruder feed hopper, opens in particular directly into the extruder 2. The feed hopper 39 corresponds substantially to the extruder preliminary container 5 according to the first embodiment example. A filter 40 for purge gas from the collecting downcomer 33 and/or from the additive collecting downcomer 34 and/or for displacement gas from the extruder may be connected to the feed hopper 39.

A double-walled additive collecting downcomer 34 with a cooling unit 28 opens into the bulk material collecting downcomer 33. The additive collecting downcomer 34 is a collecting pipe for several separate additive downcomers which open into the additive collecting downcomer 34.

Figure 9:
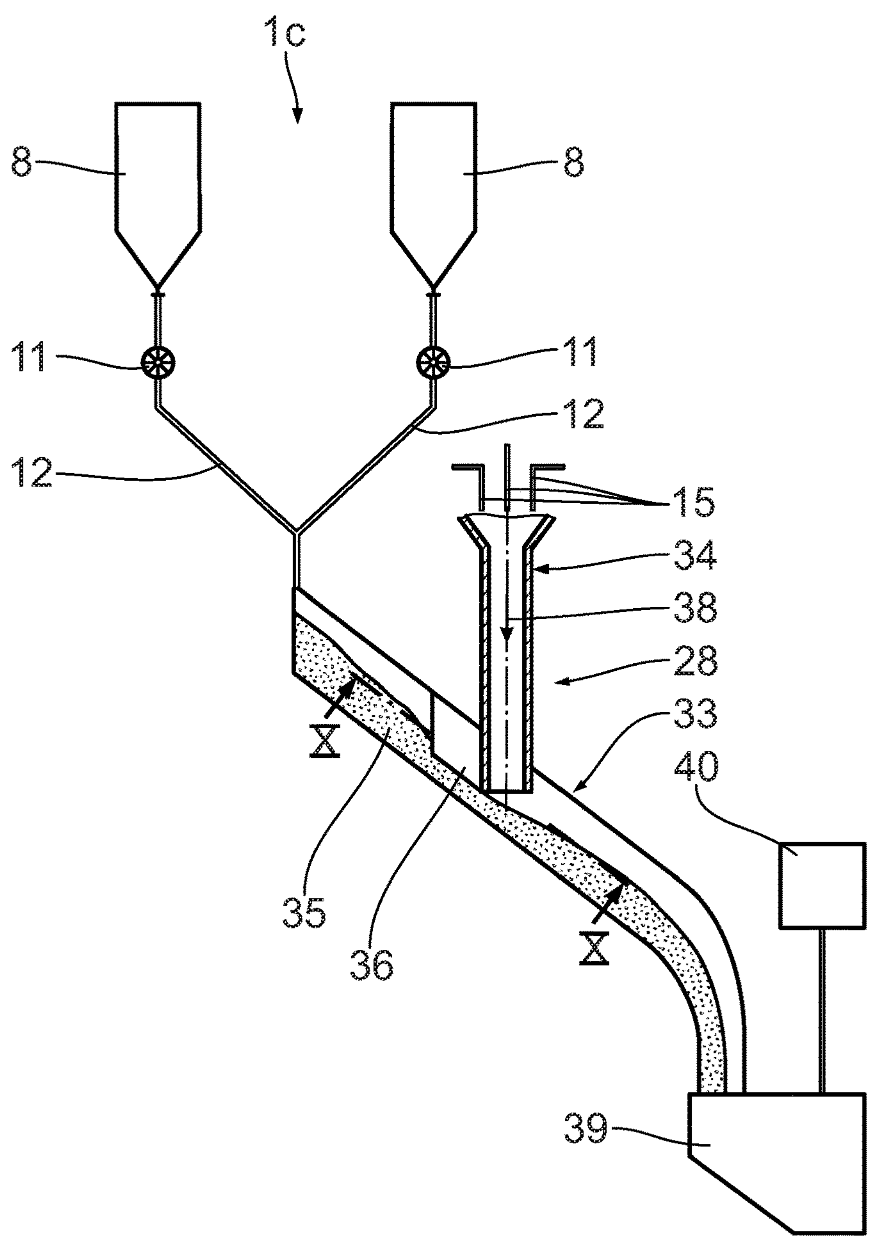
FIG. 9 shows a representation corresponding to FIG. 1 of a processing system according to a fourth embodiment example with two bulk material storage containers.
Figure 10:
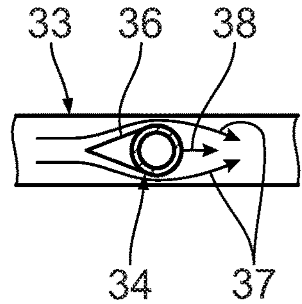
FIG. 10 shows an enlarged sectional representation according to section line X-X in FIG. 9.

FIG. 9 shows an example of the flow of bulk material 35 in the bulk material collecting downcomer 33.

A flow guiding member 36 in the form of a flow guiding plate is arranged in the bulk material collecting downcomer 33 upstream of the junction of the additive collecting downcomer 34. The flow guiding member is V-shaped in the top view according to FIG. 10, wherein the opening of the V faces the additive collecting downcomer 34. The product flows of the bulk material and the additive caused by the flow guiding member 36 are symbolized in FIG. 10 by the flow arrows 37 for the bulk material and 38 for the additive. The flow guiding member 36 is arranged in the bulk material collecting downcomer 33 at a height such that it is excluded that bulk material 35 accumulates above the flow guiding member 36 and in particular between the flow guiding member 36 and the additive collecting downcomer 34 in an unintended manner. For this purpose, the flow guiding member 36 can be attached to an upper side of the bulk material collecting downcomer 33 and, in particular, extend to the upper side of the bulk material collecting downcomer 33.

Alternatively, the flow guiding member 36 may not extend over the entire height of the bulk material collecting downcomer 33. In particular, the flow guiding member 36 is arranged at a distance from a lower side of the bulk material collecting downcomer 33, opposite the upper side.

The bulk material 35 can flow along the lower side of the bulk material collecting downcomer 33, in particular between the lower side of the bulk material collecting downcomer 33 and the flow guiding member 36, so that a bulk material flow results which is guided below the junction of the additive collecting downcomer 34.

The additive flows vertically downwards along the additive collecting downcomer 34 into the bulk material collecting downcomer 33 and is then deflected in the bulk material collecting downcomer 33 into a flow parallel to the bulk material downcomer longitudinal axis 20. The bulk material flow 37 is widened due to the flow guiding member 36, in particular above the junction of the additive collecting downcomer 34, and is guided around the junction point of the additive collecting downcomer 34 in the bulk material collecting downcomer 33, in particular on both sides. Downstream of the junction point, the bulk material flows 37 flow together again and include the additive flow 38.

Figure 11:
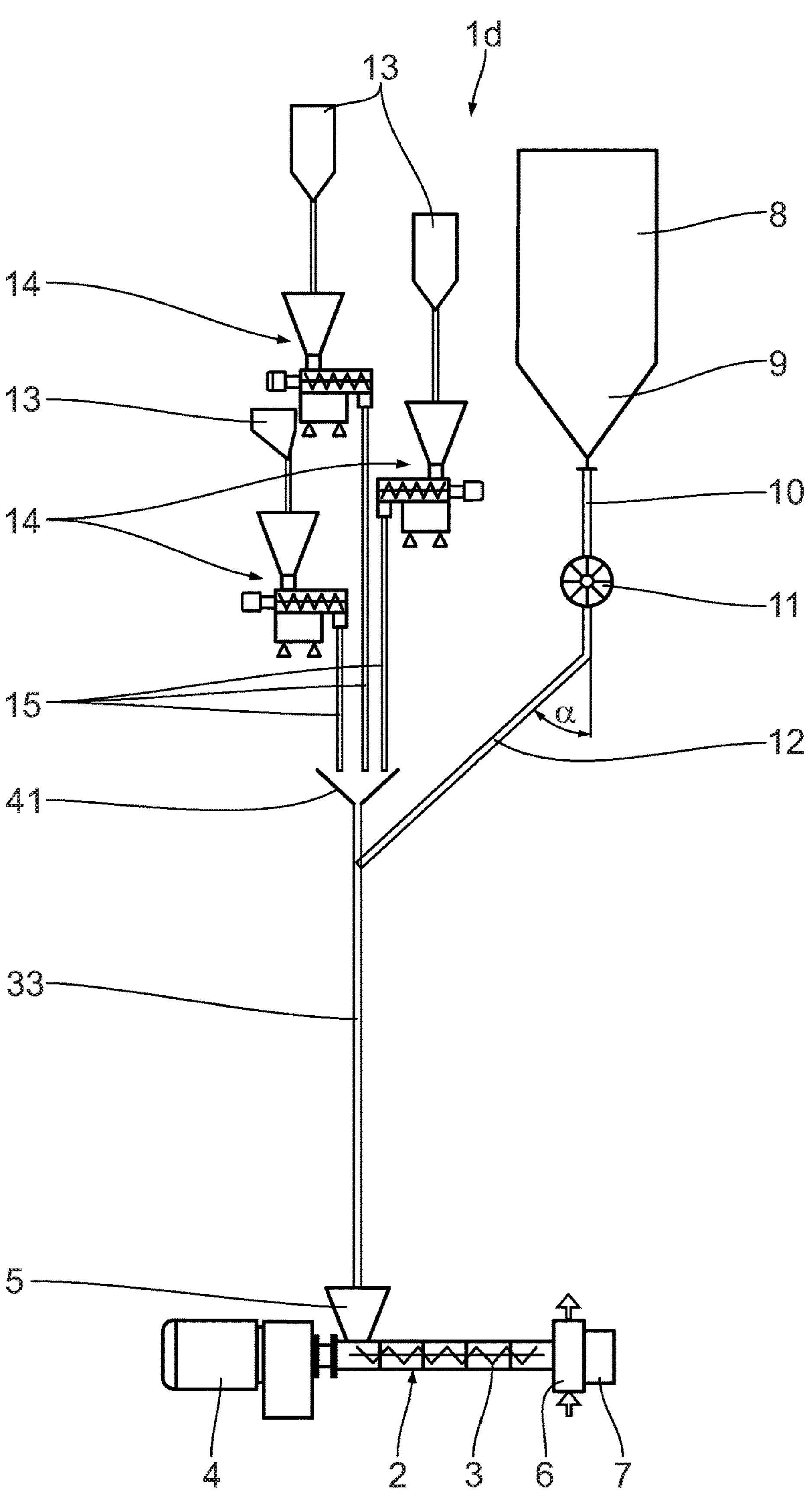
FIG. 11 shows a representation, corresponding to FIG. 1, of a processing system according to a fifth embodiment example, wherein the bulk material downcomer runs vertically at least in sections and additive downcomers open into the vertically oriented bulk material downcomer from above.

In the following, a fifth embodiment example of the invention is described with reference to FIG. 11. Constructively identical parts are given the same reference signs as in the previous embodiment examples, the description of which is hereby referred to. Constructively different but functionally similar parts are given the same reference signs with a trailing letter d.

In the processing system 1*d*, a bulk material collecting downcomer 33 is provided, which runs exclusively vertically. A bulk material downcomer 12, which is arranged to be in at least in sections at an angle $\alpha$ to the vertical, opens into the bulk material collecting downcomer 33.

The additive downcomers 15 are also oriented essentially and in particular exactly vertically. The additive downcomers 15 open from above into the bulk material collecting downcomer 33. For this purpose, a funnel-shaped receptacle 41 can be arranged at an upper end of the bulk material collecting downcomer 33.

Figure 12:
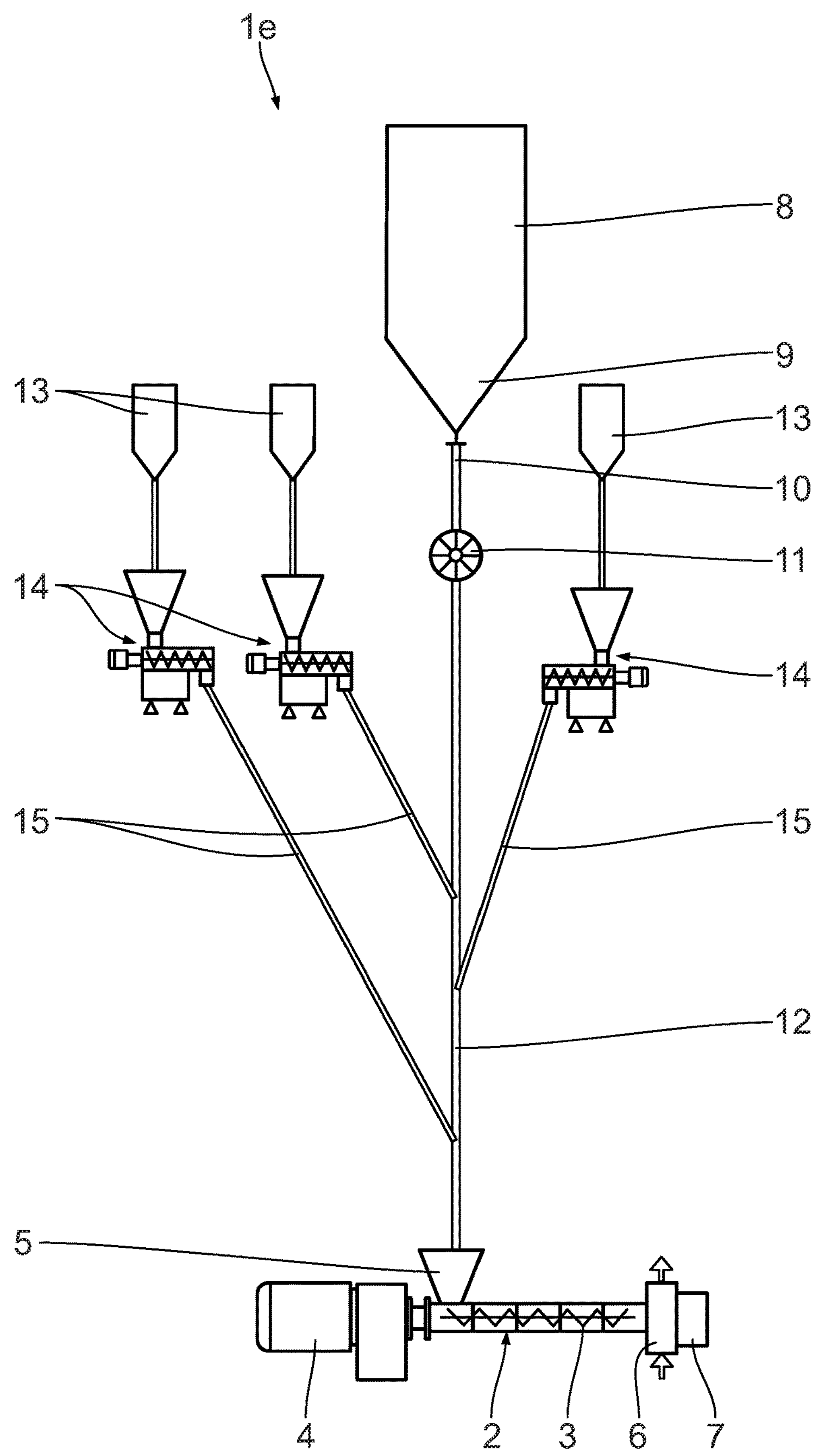
FIG. 12 shows a representation corresponding to FIG. 1 of a processing system according to a sixth embodiment example in which the bulk material downcomer is oriented exclusively vertically, into which bulk material downcomer additive downcomers that are oriented in an inclined manner open.

In the following, a sixth embodiment example of the invention is described with reference to FIG. 12. Constructively identical parts are given the same reference signs as in the previous embodiment examples, the description of which is hereby referred to. Constructively different but functionally similar parts are given the same reference signs with a trailing letter e.

In the processing system 1*e*, the bulk material downcomer 12 is oriented exclusively vertically. The additive downcomers 15 are oriented to be inclined with respect to the vertical and open laterally into the bulk material downcomer 12. In particular, the additive dosing devices 14 with the additive downcomers 15 connected to them are arranged on opposite sides, in particular circularly around the bulk material downcomer 12.

What is claimed is:

1. A processing system for bulk material comprising:

a. processing device for the bulk material, wherein the processing device is an extruder and the bulk material comprises plastics;

b. at least one bulk material storage container for storing the bulk material, c. a bulk material dosing device connected to the at least one bulk material storage container for dosed discharge of the bulk material from the bulk material storage container, wherein the bulk material dosing device is at least one of a rotary valve, a screw conveyor, a vibratory conveyor and a belt conveyor, d. a bulk material downcomer connected to the bulk material dosing device for gravimetrically conveying the bulk material into the processing device, e. at least one additive feed for feeding an additive, f. an additive dosing device connected to the at least one additive feed for dosed discharge of the additive from the additive feed, g. an additive downcomer connected to the additive dosing device for gravimetrically conveying the additive into the processing device, wherein the bulk material downcomer directly connects the bulk material dosing device to the processing device, wherein the additive downcomer opens and extends a penetration depth into the bulk material downcomer.

2. The processing system according to claim 1, wherein the bulk material downcomer is oriented at least in sections with respect to the vertical at an angle of inclination ($\alpha$).

3. The processing system according to claim 2, wherein the bulk material downcomer is oriented completely with respect to the vertical at an angle of inclination ($\alpha$).

4. The processing system according to claim 2, wherein the angle of inclination ($\alpha$) is between 10° and 75°.

5. The processing system according to claim 1, wherein the bulk material downcomer opens directly into the extruder.

6. The processing system according to claim 1, wherein the bulk material downcomer opens into an extruder preliminary container of the extruder.

7. The processing system according to claim 1, wherein the downcomer opens into a junction nozzle of the bulk material downcomer.

8. The processing system according to claim 1, wherein the additive downcomer and the bulk material downcomer are arranged at an acute angle to one another.

9. A processing system for bulk material comprising:

a. a processing device for the bulk material, b. at least one bulk material storage container for storing the bulk material, c. a bulk material dosing device connected to the at least one bulk material storage container for dosed discharge of the bulk material from the bulk material storage container, d. a bulk material downcomer connected to the bulk material dosing device for conveying the bulk material into the processing device, e. at least one additive feed for feeding an additive, f. an additive dosing device connected to the at least one additive feed for dosed discharge of the additive from the additive feed, g. an additive downcomer connected to the additive dosing device for conveying the additive into the processing device, wherein the additive downcomer opens into the bulk material downcomer, wherein the additive downcomer is arranged in the bulk material downcomer at a penetration depth (T), wherein the penetration depth (T) is at least 60% of an inner diameter ($DN_1$) of the bulk material downcomer.

10. The processing system according to claim 9, wherein the additive downcomer is arranged in the junction nozzle.

11. The processing system according to claim 9, wherein the penetration depth (T) is at least 80% of the inner diameter ($DN_1$) of the bulk material downcomer.

12. The processing system according to claim 1, wherein a flow guiding member is arranged in the bulk material downcomer upstream of the junction of the additive downcomer with the bulk material downcomer.

13. The processing system according to claim 1, wherein the additive downcomer is oriented at least in sections with respect to the vertical at an angle of inclination (B).

14. The processing system according to claim 13, wherein the additive downcomer is oriented completely with respect to the vertical at an angle of inclination (B).

15. The processing system according to claim 13, wherein the angle of inclination (B) is one of less than and equal to 40°.

16. The processing system according to claim 1, comprising a cooling unit for cooling at least one of the bulk material downcomer and the additive downcomer.

17. The processing system according to claim 16, wherein the cooling unit is attached directly to at least one of the bulk material downcomer and to the additive downcomer.

18. The processing system according to claim 1, comprising a flow support unit for supporting the flow at least one of in the bulk material downcomer and in the additive downcomer.

19. The processing system according to claim 18, wherein the flow support unit comprises a gas supply connected to at least one of the bulk material downcomer and to the additive downcomer and a mechanical member.

20. The processing system according to claim 19, wherein the mechanical member is at least one of a vibrator and a shaker.

21. The processing system according to claim 1, comprising a mixing/transport device, wherein the mixing/transport device is connected to the downstream processing device.

22. The processing system according to claim 21, wherein the mixing/transport device is a mixing/transport screw.

23. The processing system according to claim 21, wherein the mixing/transport device is connected to the downstream processing device via a connecting downcomer.

24. The processing system according to claim 21, comprising a second bulk material downcomer which connects the bulk material dosing device to the mixing/transport device.

25. The processing system according to claim 21, wherein the additive downcomer opens into the mixing/transport device.

26. The processing system according to claim 21, wherein the mixing/transport device has a mixing/transport rate which is at most 30% of a production rate of the processing device.

27. A method for processing bulk material, comprising the following steps dosed discharge of the bulk material from at least one bulk material storage container by means of a bulk material dosing device connected thereto, wherein the bulk material dosing device is at least one of a rotary valve, a screw conveyor, a vibratory conveyor and a belt conveyor, and wherein the bulk material comprises plastics, direct and gravimetric conveying of the bulk material from the bulk material dosing device through a bulk material downcomer into a processing device, wherein the processing device is an extruder, dosed discharge of an additive from at least one additive feed by means of an additive dosing device connected thereto, wherein the additive downcomer opens and extends a penetration depth into the bulk material downcomer, gravimetrically conveying the additive from the additive dosing device through an additive downcomer into the processing device.

28. The method according to claim 27, comprising cooling at least one of the bulk material downcomer and the additive downcomer by means of a cooling unit.

29. The method according to claim 28, wherein the cooling unit is attached directly to at least one of the bulk material downcomer and to the additive downcomer.

* * * * *